(12) United States Patent
Kagan et al.

(10) Patent No.: US 8,255,475 B2
(45) Date of Patent: Aug. 28, 2012

(54) NETWORK INTERFACE DEVICE WITH MEMORY MANAGEMENT CAPABILITIES

(75) Inventors: Michael Kagan, Zichron Yaakov (IL);
Diego Crupnicoff, Buenos Aires (AR);
Dror Goldenberg, Zichron Yaakov (IL);
Liran Liss, R.D. Misgav (IL)

(73) Assignee: Mellanox Technologies Ltd., Yokneam (IL)

( * ) Notice: Subject to any disclaimer, the term of this patent is extended or adjusted under 35 U.S.C. 154(b) by 435 days.

(21) Appl. No.: 12/430,912

(22) Filed: Apr. 28, 2009

(65) Prior Publication Data

US 2010/0274876 A1 Oct. 28, 2010

(51) Int. Cl.
*G06F 15/167* (2006.01)
(52) U.S. Cl. .............. 709/212; 709/216; 709/221
(58) Field of Classification Search .......... 709/221, 709/212, 216
See application file for complete search history.

(56) References Cited

U.S. PATENT DOCUMENTS

| | | | |
|---|---|---|---|
| 6,321,276 B1 * | 11/2001 | Forin | 710/3 |
| 6,766,467 B1 * | 7/2004 | Neal et al. | 714/5.11 |
| 6,981,027 B1 * | 12/2005 | Gallo et al. | 709/216 |
| 7,171,484 B1 * | 1/2007 | Krause et al. | 709/232 |
| 7,299,266 B2 | 11/2007 | Boyd et al. | |
| 7,464,198 B2 | 12/2008 | Martinez et al. | |
| 7,752,417 B2 | 7/2010 | Manczak et al. | |
| 2002/0152327 A1 | 10/2002 | Kagan et al. | |
| 2004/0221128 A1 | 11/2004 | Beecroft et al. | |
| 2004/0230979 A1 | 11/2004 | Beecroft et al. | |

OTHER PUBLICATIONS

"Linux kernel enable the IOMMU—input/output memory management unit support", Oct. 15, 2007 http://www.cyberciti.biz/tips/howto-turn-on-linux-software-iommu-support.html.

* cited by examiner

*Primary Examiner* — Larry Donaghue
*Assistant Examiner* — Nicholas Taylor
(74) *Attorney, Agent, or Firm* — D. Kligler I.P. Services Ltd.

(57) ABSTRACT

An input/output (I/O) device includes a host interface for connection to a host device having a memory and a network interface, which is configured to receive, over a network, data packets associated with I/O operations directed to specified virtual addresses in the memory. Packet processing hardware is configured to translate the virtual addresses into physical addresses and to perform the I/O operations using the physical addresses, and upon an occurrence of a page fault in translating one of the virtual addresses, to transmit a response packet over the network to a source of the data packets so as to cause the source to refrain from transmitting further data packets while the page fault is serviced.

16 Claims, 4 Drawing Sheets

NETWORK INTERFACE DEVICE WITH MEMORY MANAGEMENT CAPABILITIES

FIELD OF THE INVENTION

The present invention relates generally to computer networks, and specifically to handling of network input/output (I/O) operations.

BACKGROUND OF THE INVENTION

Computer operating systems use virtual memory techniques to permit application programs to address a contiguous working memory space, even when the corresponding physical (machine) memory space is fragmented and may overflow to disk storage. The virtual memory address space is typically divided into pages, and the computer memory management unit (MMU) uses page tables to translate the virtual addresses of the application program into physical addresses. The virtual address range may exceed the amount of actual physical memory, in which case disk files are used to save virtual memory pages that are not currently active. When an application attempts to access a virtual address that is absent from the physical memory, the MMU raises a page fault exception (commonly referred to simply as a "page fault"), which causes the operating system to swap the required page back from the disk into the memory.

I/O devices usually use physical memory addresses in order to access host memory, but some virtual memory addressing techniques for I/O have been described in the patent literature. For example, U.S. Pat. No. 6,321,276, whose disclosure is incorporated herein by reference, describes methods and systems for processing input/output requests including virtual memory addresses. A "recoverable I/O request processor" translates virtual memory addresses to physical memory addresses utilizing translation tables local to an I/O device. If a local translation fails, the I/O request processor requests virtual address mapping information from the operating system.

U.S. Patent Application Publication 2004/0221128, whose disclosure is incorporated herein by reference, describes virtual-to-physical memory mapping in network interfaces. A plurality of processing nodes in a network have respective addressable memories and respective network interfaces. Each network interface includes a memory management unit with at least one mapping table for mapping virtual addresses to the physical addresses of the addressable memory of the respective processing node.

U.S. Pat. No. 7,299,266, whose disclosure is incorporated herein by reference, describes memory management offload for RDMA (remote direct memory access) enabled network adapters. A mechanism is provided for implicitly or explicitly registering memory regions that are written to and from by an Internet Protocol Suite Offload Engine (IPSOE). The hardware is allowed to directly use a region through memory region tables and address translation tables while keeping the region isolated from use by other applications.

InfiniBand™ (IB) is a switched-fabric communications link primarily used in high-performance computing. It has been standardized by the InfiniBand Trade Association. Computing devices (host processors and peripherals) connect to the IB fabric via a network interface adapter, which is referred to in IB parlance as a channel adapter. Host processors (or hosts) use a host channel adapter (HCA), while peripheral devices use a target channel adapter (TCA). IB channel adapters implement various service types and transport protocols, including RDMA read and write operations. Details of a hardware-based implementation of IB RDMA are provided, for example, in U.S. Patent Application Publication 2002/0152327, whose disclosure is incorporated herein by reference.

SUMMARY OF THE INVENTION

Embodiments of the present invention that are described hereinbelow provide devices and methods for I/O memory management in a high-speed network environment.

There is therefore provided, in accordance with an embodiment of the present invention, an input/output (I/O) device, including a host interface for connection to a host device having a memory and a network interface, which is configured to transmit and receive, over a network, data packets associated with I/O operations directed to specified virtual addresses in the memory. Packet processing hardware is configured to translate the virtual addresses into physical addresses and to perform the I/O operations, using the physical addresses, concurrently for multiple transport service instances, including at least first and second transport service instances, such that upon an occurrence of a page fault in translating one of the virtual addresses for the first transport service instance, at least the second transport service instance continues to access the memory while the page fault is being serviced.

In a disclosed embodiment, each transport service instance includes is associated with a queue pair.

Typically, the packet processing hardware is configured to translate the virtual addresses into the physical addresses using a translation table, which is written to the I/O device by a driver program running on the host device, and to send an event notification upon the occurrence of the page fault to the driver program, so as to cause the driver program to service the page fault.

In some embodiments, at least one of the transport service instances is assigned to a virtual machine running in a guest domain on the host device, and for an I/O operation on the at least one of the transport service instances, the physical addresses into which the virtual addresses are translated belong to the guest domain, and the packet processing hardware is configured to translate the physical addresses belonging to the guest domain into machine addresses for use in accessing the memory.

In one such embodiment, the packet processing hardware includes a first translation table, which is written to the I/O device by a guest driver program running in the guest domain, for translating the virtual addresses into the physical addresses, and a second translation table, which is written to the I/O device by a host driver program running in a host domain on the host device, for translating the physical addresses into the machine addresses. The packet processing hardware may be configured to send a guest event notification to the guest driver program when the page fault occurs in the first translation table and to send a host event notification to the host driver program when the page fault occurs in the second translation table.

Additionally or alternatively, the packet processing hardware is configured to generate, responsively to the I/O operation, a first memory protection key for use in translating the virtual addresses into the physical addresses, and to generate, responsively to the first memory protection key, a second memory protection key for use in translating the physical addresses into the machine addresses.

There is also provided, in accordance with an embodiment of the present invention, an input/output (I/O) device, including a host interface for connection to a host device having a memory and a network interface, which is configured to receive, over a network, data packets associated with I/O operations directed to specified virtual addresses in the memory. Packet processing hardware is configured to translate the virtual addresses into physical addresses and to perform the I/O operations using the physical addresses, and upon an occurrence of a page fault in translating one of the virtual addresses, to transmit a response packet over the network to a source of the data packets so as to cause the source to refrain from transmitting further data packets while the page fault is serviced.

The response packet may include a receiver not ready (RNR) negative acknowledgment (NACK) packet.

There is additionally provided, in accordance with an embodiment of the present invention, a method for communication, including transmitting and receiving, over a network via an input/output (I/O) device, data packets associated with I/O operations directed to specified virtual addresses in a memory of a host device. The virtual addresses are translated into physical addresses using packet processing hardware in the I/O device. The I/O operations are performed, using the physical addresses, concurrently for multiple transport service instances, including at least first and second transport service instances, such that upon an occurrence of a page fault in translating one of the virtual addresses for the first transport service instance, at least the second transport service instance continues to access the memory while the page fault is being serviced.

There is further provided, in accordance with an embodiment of the present invention, a method for communication, including receiving, over a network via an input/output (I/O) device, data packets associated with I/O operations directed to specified virtual addresses in a memory of a host device. The virtual addresses are translated into physical addresses using packet processing hardware in the I/O device. Upon an occurrence of a page fault in translating one of the virtual addresses, a response packet is transmitted over the network to a source of the data packets so as to cause the source to refrain from transmitting further data packets while the page fault is serviced. The I/O write operations are performed using the physical addresses.

The present invention will be more fully understood from the following detailed description of the embodiments thereof, taken together with the drawings in which:

DETAILED DESCRIPTION OF EMBODIMENTS

Overview

Figure 1:
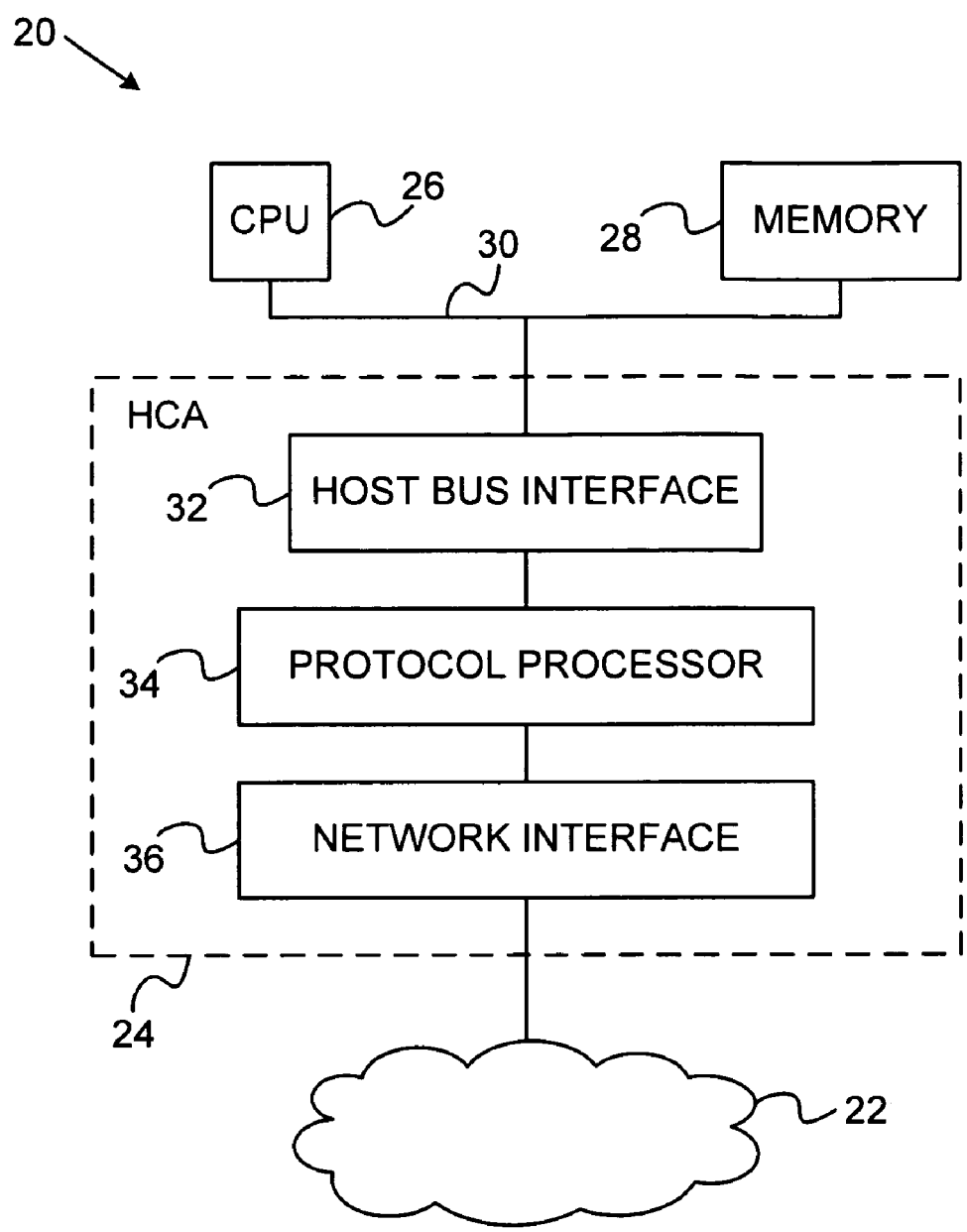
FIG. 1 is a block diagram that schematically illustrates a host computer with a host channel adapter (HCA), in accordance with an embodiment of the present invention.

When a page fault occurs in a software process running on a host central processing unit (CPU), the process typically stops at the instruction that caused the page fault (after completing all prior instructions). The process is suspended until the appropriate page of virtual memory has been swapped into memory, and then resumes its operation. While the suspended process waits for the page fault to be serviced, other processes may continue execution.

This sort of approach may not be appropriate, however, for high-speed, multi-channel I/O devices, such as an IB HCA. Unlike the CPU, the HCA does not control the execution of its operations, since the HCA will typically continue to receive incoming packets from the network while waiting for the page swap. If the HCA suspends processing of packets on a given channel until the page fault has been serviced, it must either buffer these packets, meaning that a large buffer is required at the input side of the HCA, or drop them, which will lead to transport or application protocol faults. While execution is suspended to allow the page swap on the given channel, the HCA may still need to deal with reception and transmission of packets on other channels. For these reasons, HCA devices (and most other I/O devices) that are known in the art typically used "pinned" memory, in which a range of physical memory is pre-assigned to the HCA, without memory virtualization, and page faults are thus avoided.

Embodiments of the present invention that are described hereinbelow provide devices and methods for I/O memory management that make the use of virtual memory practical for I/O devices. In some embodiments, an I/O device, such as a HCA, is configured to send and receive, over network transport connections, data packets associated with I/O operations that are directed to specified virtual addresses in a host memory. A virtual address range is defined in advance for each such transport connection. The corresponding range of physical addresses need not be pinned. It is thus possible to define multiple transport instances, each with its own virtual address range, wherein the total allocation of virtual memory addresses may exceed the available physical memory space. The I/O device typically operates on the fly and has only minimal internal buffer space of its own.

Packet processing hardware in the I/O device translates the virtual addresses into physical addresses and carries out the I/O operations using the physical addresses. When a page fault occurs, processing of the transport service instance in question is delayed until the appropriate page has been swapped into the host memory. In a read operation from a virtual address in the host memory, the operation may be delayed without data loss, since in this case the data are inherently already buffered by the host. On the other hand, when a page fault occurs in a write operation directed to a virtual address in the host memory, the I/O device cannot generally buffer the incoming data packets while waiting for the page swap. Furthermore, accumulation of packets in the input buffer will cause back-pressure on the network link connecting to the I/O device, leading to congestion that may propagate back throughout the network.

To avoid transport faults and congestion in this latter sort of situation, the I/O device transmits a response packet over the transport connection in question to the source of the data packets, instructing the source to refrain from transmitting further data packets while the page fault is serviced. For example, an IB HCA may transmit a RNR NACK packet (receiver not ready—negative acknowledgment) to the packet source. The packet specifies a length of time that the packet source should wait before resuming transmission, which may be a relatively long time in order to permit the page swap in host memory to be completed. When the page swap has been completed, the HCA may transmit a further packet, such as an unsolicited ACK packet, prompting the packet source to resume transmission. Alternatively, the packet source may resume transmission automatically when the time has expired. In either case, the packet source will retransmit the packet that engendered the page fault, followed by further packets as appropriate. This sort of graceful handling of page faults, without loss of data, takes place at the level of hardware-based protocol processing in the HCA, with little or no added burden on the host CPU. It can be used to advantage in both single-channel and multi-channel I/O devices.

Some I/O devices, such as IB HCAs, handle multiple transport service instances concurrently. (The transport service instances can be regarded as parallel communication channels, and are referred to in IB parlance as queue pairs (QPs).) Each QP is associated with a respective host process and is used for communicating with a respective node across the IB fabric. In embodiments of the present invention, when a page fault occurs in translating a virtual address for one of the QPs, memory operations associated with that QP may be suspended until the appropriate page has been swapped into physical memory. In the meanwhile, however, other QPs may continue to access the memory without added delay while the page fault is serviced.

In a virtual machine environment, the host operating system may support a virtual machine monitor (VMM), which in turn supports one or more guest operating systems. Applications in both the host domain and the guest domains are able to address and use the HCA directly, by interacting with respective QPs. In some embodiments of the present invention, the HCA performs a dual-level address translation process for virtual memory addresses that are associated with guest domains: First, translation from virtual to "physical" addresses using respective page tables for each guest domain, and then translation from these "physical" addresses to actual machine memory addresses. (The "physical" addresses in this context are regarded by the guest operating systems as real, physical memory addresses, but they are, in fact, virtual addresses at the intermediate stage of address translation. The term "physical address," in the context of the present patent application and in the claims, should thus be understood as including this sort of intermediate virtual address, as well as actual machine addresses.)

Page faults may occur at either stage of the address translation process. When a page fault occurs in the first stage, the HCA issues a page fault event to the guest domain, whereas when a page fault occurs in the second stage, the HCA issues a page fault event to the host domain. In either case, the HCA handles the page fault gracefully, as described above, while the appropriate driver software on the host CPU invokes the necessary page swapping.

System Description

FIG. 1 is a block diagram that schematically shows components of a host computer 20, in accordance with an embodiment of the present invention. Computer 20 comprises an I/O device, such as an IB HCA 24, for communication with a packet network 22, such as an IB fabric or an Ethernet network, for example. The computer comprises a host processor 26, which is typically a general-purpose central processing unit (CPU), and a system memory 28, connected to the host processor by a host bus 30, under the control of a suitable memory controller (not shown), as is known in the art. Memory 26 holds program instructions and application data, as well as metadata structures that are accessed and used by HCA 24 in managing data transfer operations.

HCA 24 is connected to bus 30 by a host bus interface 32, comprising circuitry that enables the HCA to read and write data directly to and from memory 28. Network interface circuitry connects to network 22. Protocol processing circuitry 34 in the HCA performs transport-layer processing functions in accordance with instructions received from the host processor. These functions include constructing data packets containing data gathered from memory 28 for transmission over network 22, as well as receiving and processing incoming packets from network 22 and scattering the data contained in the packets to memory 28. The functions of the HCA are typically implemented in dedicated hardware circuits, such as those described in the above-mentioned U.S. Patent Application Publication 2002/0152327.

Client processes running on computer 20 communicate with the transport layer of network 22 via HCA 24 by manipulating a transport service instance, known as a "queue pair" (QP), which is made up of a send work queue and a receive work queue. A given client may open and use multiple QPs simultaneously. Each QP has a QP context (QPC), which may be held in memory 28. The QPC is used and updated by HCA 24 in the course of processing communications on that QP. Each QP is configured for a certain transport service type, based on how the requesting and responding QPs interact. There are four service types: reliable connection, unreliable connection, reliable datagram and unreliable datagram.

To send and receive communications over network 22, the client process initiates work requests (WRs), which causes work items, referred to as work queue elements (WQEs), to be placed in the appropriate queues for execution by the HCA. Upon completion of a work item, the HCA writes completion queue elements (CQEs) to appropriate queues, which are then read by the client process as an indication that the WR in question has been completed.

For any given operation, the QP that initiates the operation, i.e. injects a message into network 22, is referred to as the requester, while the QP that receives the message is referred to as the responder. (A given QP can be both a requester and a responder in different operations.) An IB operation is defined to include a request message generated by the requester and, as appropriate, its corresponding response generated by the responder. (Not all request messages have responses.) Each IB message consists of one or more IB packets, depending on the size of the message payload compared to the maximum transfer unit (MTU) of the message path.

Typically, a given channel adapter will serve multiple QPs concurrently, serving both as a requester, transmitting request messages and receiving responses on behalf of local clients, and as a responder, receiving request messages from other channel adapters and returning responses accordingly. Request messages include, inter alia, RDMA write and send requests, which cause the responder to write data to a memory address at its own end of the link, and RDMA read requests, which cause the responder to read data from a memory address and return it to the requester. RDMA read and write requests specify the memory range to be accessed by the HCA in the local memory of the responder, whereas send requests leave the choice of memory range to the responder. In the present embodiment, the memory range for at least some RDMA requests is assumed to be specified in terms of virtual memory addresses, which are translated by HCA 24 into machine addresses in memory 28, as described hereinbelow. For the sake of clarity and simplicity, the following description will relate specifically to RDMA requests, but the techniques described hereinbelow are similarly applicable to send requests that use virtual memory addresses.

Figure 2:
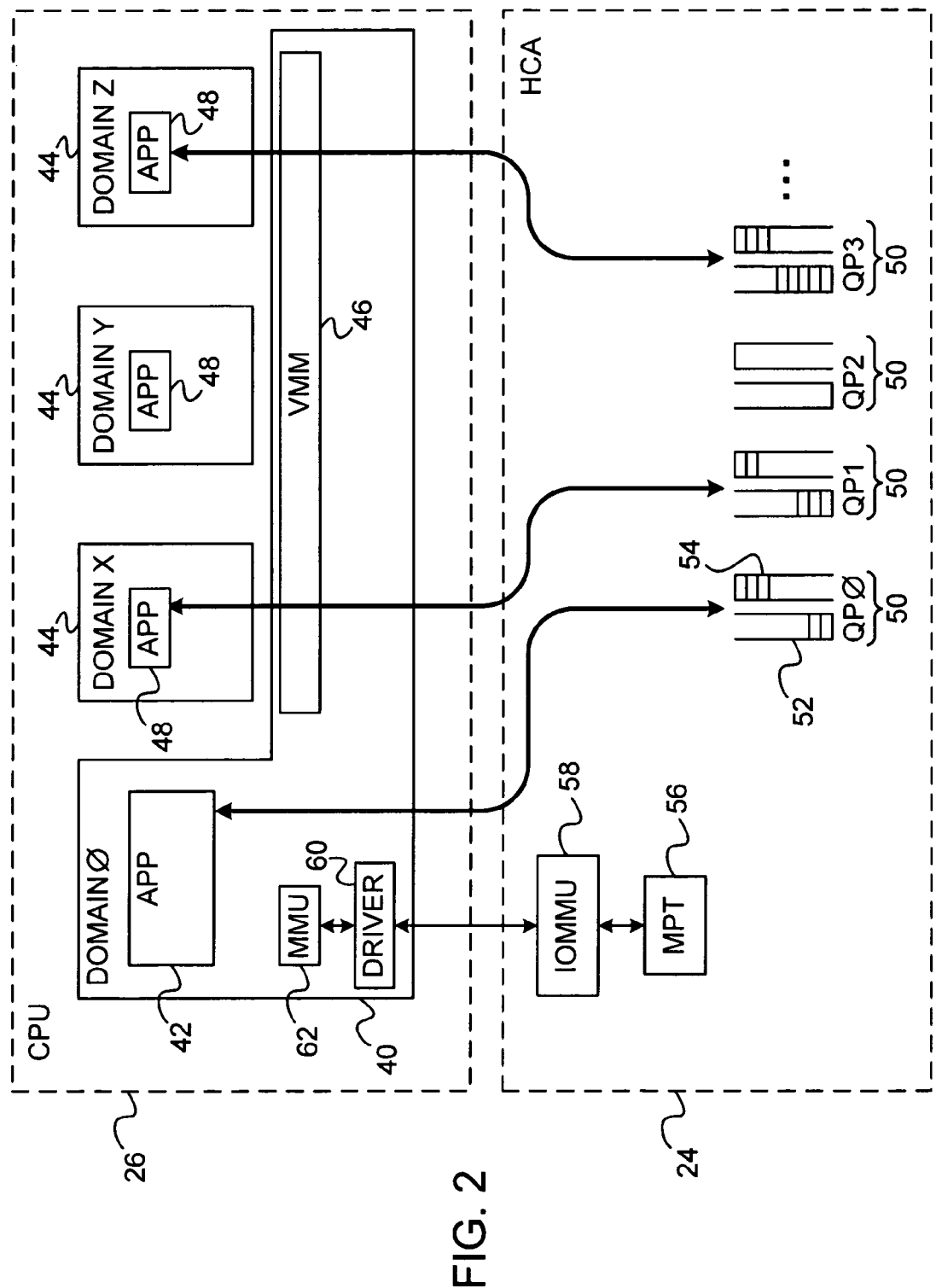
FIG. 2 is a block diagram that schematically shows functional details of interaction between host computer software and a HCA, in accordance with an embodiment of the present invention.

FIG. 2 is a block diagram that schematically shows functional details of interaction between HCA 24 and software running on CPU 26, in accordance with an embodiment of the present invention. In this embodiment, computer 20 is assumed to support a virtual machine environment, in which HCA 24 performs a two-stage address translation process, as described hereinbelow. Certain aspects of the page translation mechanism, including the methods of handling page faults that are described herein, are likewise applicable to computers running only a single, host operating system, as will be apparent to those skilled in the art.

CPU 26 operates a host domain 40 (referred to in the figure as DOMAIN 0), with a host operating system (not shown), which supports host applications 42. In addition, the CPU may concurrently run one or more virtual machines 44 (labeled DOMAIN X, DOMAIN Y, DOMAIN Z, . . . ), each with its own guest operating system and guest applications 48. A virtual machine monitor (VMM) 46 in the host domain, also referred to as a hypervisor, interacts with the kernels of the guest operating systems in a manner that emulates the host processor and allows the virtual machines to share the resources of the CPU. A wide range of virtual machine software of this sort is available commercially, and further description is beyond the scope of the present invention.

For efficient use of HCA resources, both host domain 40 and virtual machines 44 are able to interact directly with the HCA, rather than passing commands and data through the host domain. Thus, as shown in FIG. 2, each application 42, 48 may be assigned one or more queue pairs 50 (labeled QP0, QP1, . . . , in the figure), comprising a send queue 52 and a receive queue 54, as explained above. Furthermore, each virtual machine may post control and configuration commands to the HCA via a respective command queue (not shown). In other words, the HCA appears to each virtual machine to be a dedicated I/O device for use by that virtual machine. This configuration minimizes the burden on VMM 46 and on the host operating system.

Using the respective QPs 50, each virtual machine 44 is able to execute data flow operations directly between HCA 24 and memory 28. For this purpose, a HCA driver 49 in each virtual machine 44 (only one such driver is shown for simplicity) assigns memory protection keys and virtual address spaces for use by the respective QPs. The driver loads the keys and address translation tables into a memory protection and translation (MPT) unit 56, for use by the HCA in servicing work items in the QP. A HCA driver 60 in host domain 40 loads keys and address translation tables for use by host applications 42.

The address translation tables loaded into MPT unit 56 by the HCA drivers convert virtual addresses into physical addresses. In the case of driver 60 of the host domain, the physical addresses are actual machine addresses in memory 28. For virtual machines 44, however, these "physical addresses" are actually just another level of virtual addresses, defined in the virtual address space that is allocated to each virtual machine. The "physical addresses" in the virtual machine address spaces are translated by an I/O memory management unit (IOMMU) 58 into actual machine addresses in memory 28, which are used in writing to and reading from the memory via bus 30. Driver 60 loads the required address translation tables into IOMMU 58, based on the virtual memory spaces that have been assigned to each of the virtual machines.

For the sake of conceptual clarity, MPT unit 56 and IOMMU 58 are shown in FIG. 2 as separate entities. In practice, however, these two entities may be combined into a unified set of translation and protection tables, as illustrated below in FIG. 3. Alternatively, the functions of the IOMMU may be carried out by a separate unit, which may even be located outside HCA 24 on bus 30. The configuration shown in FIGS. 2 and 3, however, is advantageous in conserving system resources and enhancing the flexibility of the HCA.

As noted earlier, the virtual memory space that is allocated in computer 20 to virtual machines 44 and to applications 42, 48 may exceed the actual amount of space available in memory 28. This sort of oversubscription may occur both in the allocation of memory to the virtual machines and in the allocation of this "virtual physical" memory among applications 48. A memory management unit (MMU) 62 therefore swaps pages of data into memory 28 when they are needed and out to mass storage (such as to disk) when they are not. When HCA 24 encounters a page fault in MPT unit 56 or IOMMU 58, it informs driver 49 or 60, which may then update the appropriate table. If necessary, the driver instructs MMU 62 to swap the required page into memory 28. Details of handling of page faults are described hereinbelow with reference to FIG. 4.

Address Translation and Page Fault Handling

Figure 3:
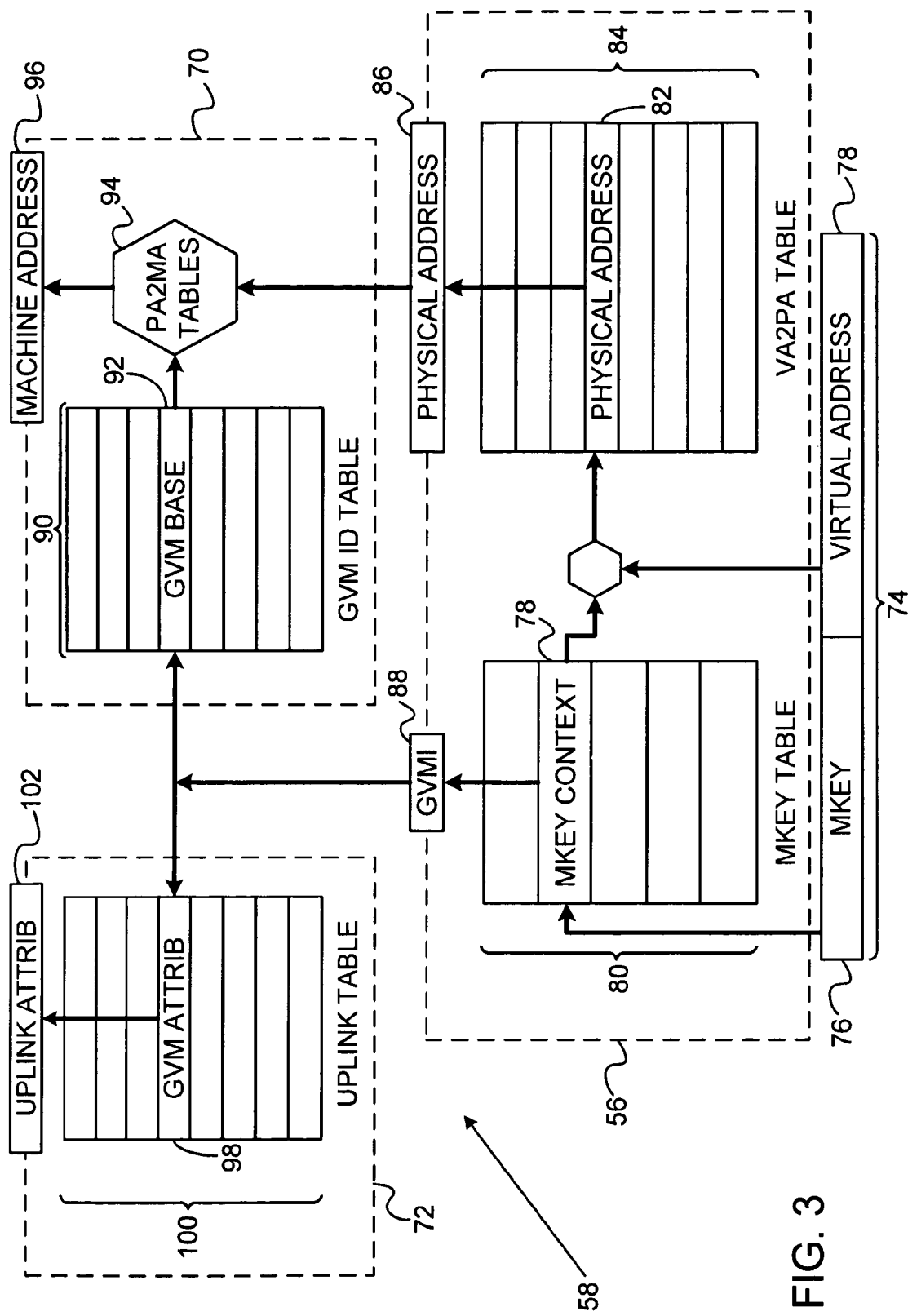
FIG. 3 is a block diagram that schematically illustrates translation and protection tables, in accordance with an embodiment of the present invention.

FIG. 3 is a block diagram that schematically illustrates the operation of translation and protection tables in HCA 24, in accordance with an embodiment of the present invention. The figure illustrates a two-stage translation process, which is carried out in MPT unit 56 and IOMMU 58. The process may be carried out by processing circuitry within host bus interface 32 of HCA 24 or within protocol processor 34. Both of these elements of the HCA may be considered a part of the packet processing hardware for the purposes of the present description and claims.

As noted above, WQEs serviced by HCA 24 on a given QP specify locations in memory 28 by means of an access address 74 comprising a memory key (MKey) 76 and a virtual address 78. The memory key points to a MKey context 79 in a memory protection table 80. This context serves (at least) two purposes:

It provides the base address for use in looking up a physical address entry 82 corresponding to virtual address 78 in a memory translation table 84.

It provides a guest virtual machine identifier (GVMI) 88 for use by IOMMU 58.

Tables 80 and 84 are provided in MPT unit 56 for each virtual machine 44 and are written to HCA 24 by the driver 49 in that virtual machine. Thus, a "physical address" 86 that is output by table 84 for a QP of a virtual machine is not actually a machine address in memory 28, but is rather a virtual address in the address space of that virtual machine, as explained above. The exception to this generalization is for QPs assigned to host domain 40, for which physical address 86 is a machine address. (The host domain typically has its own GVMI, which is commonly set to zero.)

IOMMU 58 comprises an address translation section 70 and an attribute translation section 72. The functions of these sections are typically (although not necessarily) turned on for QPs belonging to virtual machines 44 and off for QPs belonging to host domain 40. For a given virtual machine, GVMI 88 serves as a key to extract a base address 92 from a GVM identifier table 90. This base address is used in looking up a machine address 96 that corresponds to physical address 86 in physical-to-machine address (PA2MA) tables 94. Tables 90 and 94 are written by driver 60 of host domain 40.

GVMI 88 is also used in looking up a GVM attribute 98 in an uplink table 100. Section 72 accordingly outputs an uplink attribute 102, which is used, along with machine address 96, in memory access requests on bus 30. The uplink attribute is useful in efficient enforcement of memory protection among different virtual machines running on computer 20 by an IOMMU external to HCA 24, but it is not strictly needed when the IOMMU function is performed within the HCA, as in the configuration described above.

Figure 4:
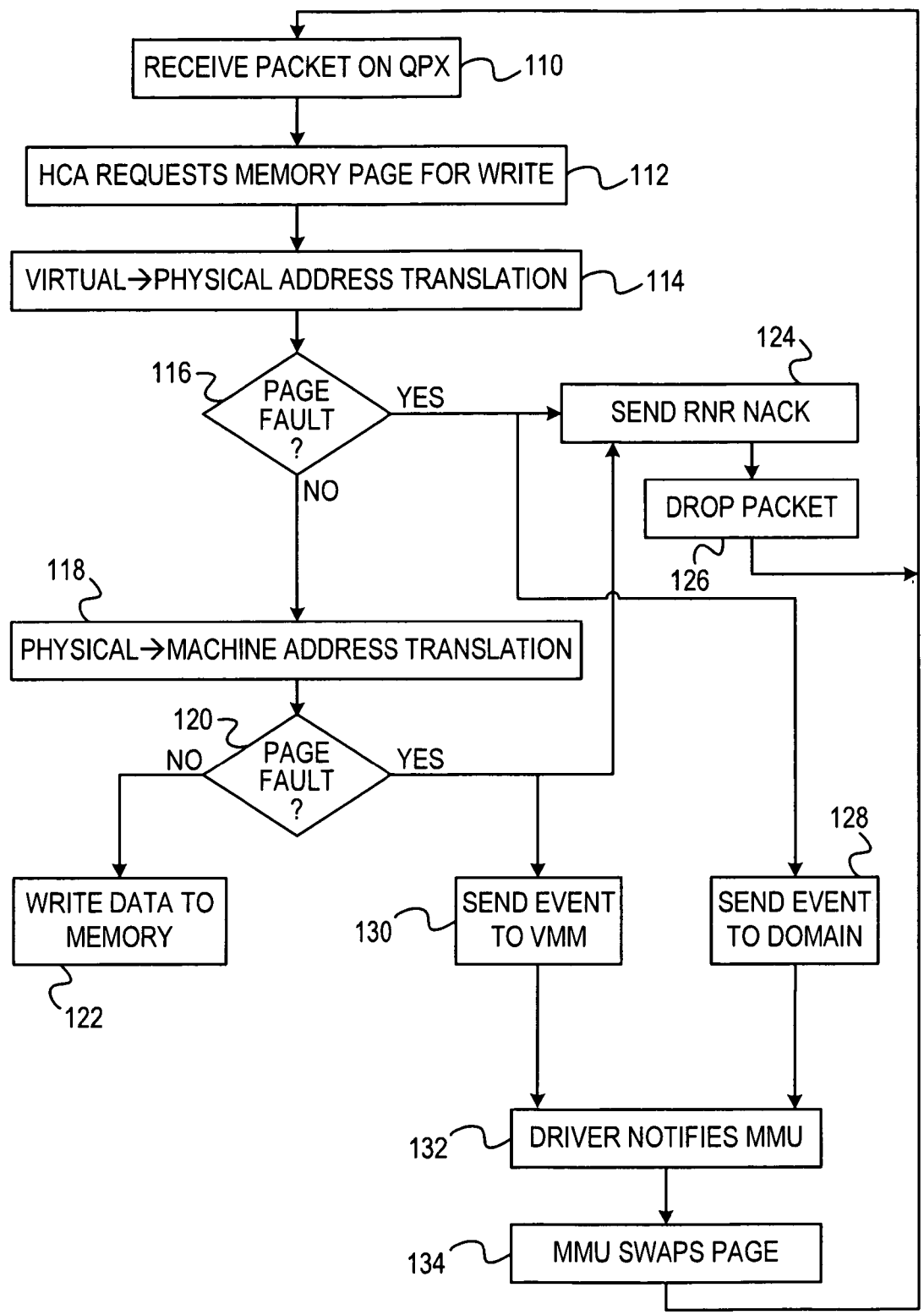
FIG. 4 is a flow chart that schematically illustrates a method of I/O memory access, in accordance with an embodiment of the present invention.

FIG. 4 is a flow chart that schematically illustrates a method for memory access by HCA 24, in accordance with an embodiment of the present invention. The method will be described hereinbelow with reference to handling of a RDMA write packet received by HCA 24 on a reliable connection. The method may also be adapted, mutatis mutandis, for handling of RDMA read packets and send packets, as well as for unreliable connections.

The method of FIG. 4 is initiated when HCA 24 receives an incoming RDMA write packet via network interface 36, at a packet reception step 110. The packet identifies the queue pair (in this case, QPx) to which it belongs and specifies a virtual memory address in the memory of computer 20 to which the data in the packet are to be written. It will be assumed that the queue pair in question belongs to one of virtual machines 44—in this case, DOMAIN X (FIG. 2).

Protocol processor 34 in HCA 24 submits an access request to MPT 56 to find the physical memory page to which the data are to be written, at a page request step 112. The access request, as explained above, comprises memory key 76 for QPx and virtual address 78. MPT 56 looks up the request parameters in tables 80 and 84, at a virtual-to-physical address translation step 114. MPT 56 checks the virtual address in table 84, using the base address provided from context 79, at a physical page fault checking step 116.

If a corresponding valid entry is found in table 84 (no page fault), MPT 56 passes the appropriate physical address 86 and GVMI 88 to IOMMU 58, at a physical-to-machine address translation step 118. Address translation section 70 looks up the physical address in tables 94, using base address 92, at a machine page fault checking step 120. If the appropriate machine address is found in table 94 (no page fault), protocol processor 34 writes the RDMA data to the machine address in memory 28, at a data writing step 122.

If a page fault does occur, at either step 116 or step 120, it is desirable that transmission of packets to computer 20 on this QP be suspended until the page fault is serviced. Otherwise, on a reliable connection, HCA 24 will need to buffer the packets until the page fault is serviced, and if the buffer space is inadequate, the HCA will have to drop packets, resulting in a fatal error on the connection. On unreliable connections, the HCA may either drop or buffer packets, since there is no guarantee of packet delivery for this type of service in any case.

To interrupt packet transmission when a page fault occurs at step 116 or step 120, HCA 24 sends a RNR NACK packet to the source of the packets, at a NACK transmission step 124. The RNR NACK is a type of message mandated by IB specifications, which is sent by a receiver of packets to indicate that it is not ready to receive packets and specifies a timeout period during which the transmitter should suspend transmission. Upon receiving the RNR NACK, the transmitter waits either until it has received another packet (such as an unsolicited ACK) from HCA 24 or until the specified timeout period has elapsed, and then retransmits its packets, starting from the packet that engendered the RNR NACK response from the receiver. Although this RNR NACK mechanism is described here in the context of the virtual machine environment shown in FIG. 2, it is equally useful when only a host operating system is present.

After sending the RNR NACK packet at step 124, HCA 34 drops the RDMA packet that caused the page fault, at a packet dropping step 126, and continues to service other QPs. A scheduling mechanism (not shown) in protocol processor 34 delays servicing the WQEs on QPx until the page fault has been resolved and allows WQEs on other QPs to move ahead in line for service. This mechanism permits the page fault on QPx to be serviced gracefully, with a delay in packet reception but no fatal errors or other interruption of service. Meanwhile, service on other QPs by the HCA is substantially unaffected.

If a page fault occurs at step 116, it means that memory translation table 84 needs to be updated by driver 49 in DOMAIN X. Therefore, MPT unit 56 sends a page fault event to driver 49, at a domain event generation step 128. The driver checks whether the specified virtual address is valid, i.e., whether there is a corresponding "physical address" in DOMAIN X that is available in the host memory. If so, the driver simply updates the entries in table 84 to include the appropriate virtual and physical addresses. Otherwise, the driver notifies VMM 46, which in turn informs MMU 62 that a page swap is needed, at a driver notification step 132.

On the other hand, if a page fault occurs at step 120, IOMMU 58 sends a page fault event to driver 60 in host domain 40, at a host event generation step 130. In this case driver 60 checks whether physical address 86 is valid, updates table 94 if it is, and otherwise notifies MMU 62 of the required page swap at step 132.

MMU 62 swaps the required page into memory 28, at a swapping step 134, and notifies driver 49 or 60 of the swap, as appropriate. The driver then updates the appropriate table in MPT unit 56 or IOMMU 58 with a valid entry for the address that was requested previously. Thus, when the next packet is received on QPx at step 110, the tables will be up to date, and the RDMA write operation will be able to proceed. HCA 24 may transmit an unsolicited ACK packet over QPx in order to indicate to the requester that the RDMA write operation can now resume, or it may simply wait until the timeout specified by the RNR NACK packet has expired.

When MMU 62 swaps a page into memory 28, it usually needs to swap out another page to disk. In such a case, the MMU may notify driver 60 and/or driver 49, which then invalidates the translation table entries corresponding to the page that has been swapped out.

Page faults occurring in other types of RDMA read and write operations and send operations may be handled in a similar fashion. When a page fault occurs during a RDMA read operation from memory 28, for example, HCA 24 will notify the appropriate driver and will wait for the page fault to be services before resuming packet transmission. In this case, there is no need to send notification over the network, since the data awaiting transmission are buffered in memory 28, and the requester on network 22 will simply wait until transmission resumes. On unreliable connections, as noted above, packets may simply be dropped until the page fault has been serviced.

Although the embodiments described above use IB network conventions and interface devices, the principles of the present invention may similarly be applied to I/O devices of other sorts, using other network standards, protocols, and conventions. For example, the devices and methods described above may be applied, mutatis mutandis, in data transmission over Ethernet networks, and particularly in implementation of RDMA protocols over such networks. The implementation may be based on IB protocols and specifications, as described above, or it may alternatively be based on other protocols that are known in the art, particularly protocols that allow direct access to the I/O device by user-level application protocols, as illustrated in FIG. 2. Alternatively, the principles of the present invention may be adapted for use with kernel-level protocols, such as the well-known Transport Control Protocol (TCP).

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An input/output (I/O) device, comprising:
a host interface for connection to a host device having a memory;
a network interface, which is configured to transmit and receive, over a network, data packets associated with I/O operations directed to specified virtual addresses in the memory; and
packet processing hardware, which is configured to translate the virtual addresses into physical addresses and to perform the I/O operations, using the physical addresses, concurrently for multiple transport service instances, comprising at least a first transport service instance that is assigned to a virtual machine running in a guest domain on the host device and a second transport service instance,
wherein the packet processing hardware is configured, upon an occurrence of a page fault in translating one of the virtual addresses for the first transport service instance, to send an event notification to a driver program, selected from a set of event notifications consisting of a guest event notification, which causes the driver program to service the page fault in the guest domain, and a host event notification, which causes the driver program to service the page fault in a host domain, while at least the second transport service instance continues to access the memory while the page fault is being serviced.

2. The device according to claim 1, wherein the I/O operations comprise a write operation directed to a specified virtual address, and wherein the packet processing hardware is configured to transmit a response packet over the network to a source of the data packets so as to cause the source to refrain from transmitting further data packets while the page fault is serviced.

3. The device according to claim 1, wherein each transport service instance comprises a queue pair.

4. The device according to claim 1, wherein the packet processing hardware is configured to translate the virtual addresses into the physical addresses using a translation table, which is written to the I/O device by a driver program running on the host device, and to send an event notification upon the occurrence of the page fault to the driver program, so as to cause the driver program to service the page fault.

5. A method for communication, comprising:
transmitting and receiving, over a network via an input/output (I/O) device, data packets associated with I/O operations directed to specified virtual addresses in a memory of a host device;
translating the virtual addresses into physical addresses using packet processing hardware in the I/O device;
performing the I/O operations, using the physical addresses, concurrently for multiple transport service instances, comprising at least a first transport service instance that is assigned to a virtual machine running in a guest domain on the host device and a second transport service instance; and
upon an occurrence of a page fault in translating one of the virtual addresses for the first transport service instance, sending an event notification to a driver program, selected from a set of event notifications consisting of a guest event notification, which causes the driver program to service the page fault in the guest domain, and a host event notification, which causes the driver program to service the page fault in a host domain, while at least the second transport service instance continues to access the memory while the page fault is being serviced.

6. The method according to claim 5, wherein the I/O operations comprise a write operation directed to a specified virtual address, and wherein the method comprises transmitting a response packet over the network from the I/O device to a source of the data packets so as to cause the source to refrain from transmitting further data packets while the page fault is serviced.

7. The method according to claim 5, wherein each transport service instance comprises a queue pair.

8. The method according to claim 5, wherein translating the virtual address comprises translating the virtual addresses into the physical addresses using a translation table, which is written to the I/O device by a driver program running on the host device, and sending an event notification upon the occurrence of the page fault to the driver program, so as to cause the driver program to service the page fault.

9. An input/output (I/O) device, comprising:
a host interface for connection to a host device having a memory;
a network interface, which is configured to transmit and receive, over a network, data packets associated with I/O operations directed to specified virtual addresses in the memory; and
packet processing hardware, which is coupled between the host interface and the network interface and is configured to translate the virtual addresses into machine addresses in the memory and to perform the I/O operations, using the machine addresses, concurrently for multiple transport service instances, comprising at least one transport service instance that is assigned to a virtual machine running in a guest domain on the host device,
wherein the packet processing hardware is configured, for an I/O operation on the at least one transport service instance, to translate the virtual addresses into physical addresses in the guest domain, and to translate the physical addresses in the guest domain into the machine addresses for use in accessing the memory,
wherein the packet processing hardware comprises a first translation table for translating the virtual addresses into the physical addresses, and a second translation table for translating the physical addresses into the machine addresses, and
wherein the packet processing hardware is configured, upon an occurrence of a page fault in translating one of the virtual addresses for the at least one transport service instance, to send a guest event notification when the page fault occurs in the first translation table and to send a host event notification when the page fault occurs in the second translation table.

10. The device according to claim 9, wherein the first translation table is written to the I/O device by a guest driver program running in the guest domain, and the second translation table is written to the I/O device by a host driver program running in a host domain on the host device.

11. The device according to claim 10, wherein the packet processing hardware is configured, to send the guest event notification to the guest driver program when the page fault occurs in the first translation table and to send the host event notification to the host driver program when the page fault occurs in the second translation table.

12. The device according to claim 9, wherein the packet processing hardware is configured to generate, responsively to the I/O operation, a first memory protection key for use in translating the virtual addresses into the physical addresses, and to generate, responsively to the first memory protection key, a second memory protection key for use in translating the physical addresses into the machine addresses.

13. A method for communication, comprising:

transmitting and receiving, over a network via an input/output (I/O) device, data packets associated with I/O operations directed to specified virtual addresses in a memory of a host device;

translating the virtual addresses into machine addresses in the memory using packet processing hardware in the I/O device; and performing the I/O operations, using the machine addresses, concurrently for multiple transport service instances, comprising at least one transport service instance that is assigned to a virtual machine running in a guest domain on the host device, wherein for an I/O operation on the at least one transport service instance, translating the virtual addresses into the machine addresses comprises translating the virtual addresses into physical addresses in the guest domain, and translating the physical addresses in the guest domain into the machine addresses for use in accessing the memory, wherein translating the virtual addresses comprises using a first translation table for translating the virtual addresses into the physical addresses, and using a second translation table for translating the physical addresses into the machine addresses, and wherein, upon occurrence of a page fault, translating the virtual addresses comprises sending a guest event notification when the page fault occurs in the first translation table, and wherein translating the physical addresses comprises sending a host event notification when the page fault occurs in the second translation table.

14. The method according to claim 13, wherein the first translation table is written to the I/O device by a guest driver program running in the guest domain, and wherein the second translation table is written to the I/O device by a host driver program running in a host domain on the host device.

15. The method according to claim 14, wherein translating the virtual addresses comprises sending the guest event notification to the guest driver program when the page fault occurs in the first translation table, and wherein translating the physical addresses comprises sending the host event notification to the host driver program when the page fault occurs in the second translation table.

16. The method according to claim 13, wherein translating the virtual addresses comprises generating, responsively to the I/O operation, a first memory protection key for use in translating the virtual addresses into the physical addresses, and wherein translating the physical addresses comprises generating, responsively to the first memory protection key, a second memory protection key for use in translating the physical addresses into the machine addresses.

\* \* \* \* \*